United States Patent [19]

Skaletz et al.

[11] Patent Number: 5,679,424

[45] Date of Patent: Oct. 21, 1997

[54] INJECTION MOLDING OF THERMOPLASTIC MATERIAL INCLUDING FROM 2 TO 8% BY WEIGHT OF GLASS FIBERS

[75] Inventors: Detlef Skaletz, Mainz; Horst Heckel, Darmstadt; Karin Mehmke, Frankfurt am Main, all of Germany

[73] Assignee: Hoechst Aktiengesellschaft, Frankfurt am Main, Germany

[21] Appl. No.: 285,729

[22] Filed: Aug. 4, 1994

[30] Foreign Application Priority Data

Aug. 6, 1993 [DE] Germany .............................. 9311731 U

[51] Int. Cl.⁶ .................................................. B32B 17/04
[52] U.S. Cl. ........................ 428/35.7; 428/297.4; 428/902
[58] Field of Search .............................. 428/35.7, 297.4, 428/902

[56] References Cited

U.S. PATENT DOCUMENTS

| | | | |
|---|---|---|---|
| 4,369,941 | 1/1983 | Nijs | 428/258 X |
| 4,465,821 | 8/1984 | Nielinger et al. | 528/340 X |
| 5,019,450 | 5/1991 | Cogswell et al. | 428/402 |
| 5,041,258 | 8/1991 | Iiyama et al. | 264/328.1 |
| 5,268,050 | 12/1993 | Azari | 264/136 X |
| 5,344,689 | 9/1994 | Ide et al. | 428/292 X |
| 5,362,431 | 11/1994 | Guerrini et al. | 264/136 X |
| 5,571,610 | 11/1996 | Loftus et al. | 428/297.4 |

FOREIGN PATENT DOCUMENTS

| | | |
|---|---|---|
| 0058980 | 9/1982 | European Pat. Off. |
| 0276828 | 8/1988 | European Pat. Off. |
| 0439625 | 8/1991 | European Pat. Off. |
| 0459321 | 12/1991 | European Pat. Off. |
| 9302401.0 | 7/1993 | Germany. |
| 1241406 | 9/1989 | Japan. |
| 3121146 | 5/1991 | Japan. |

OTHER PUBLICATIONS

Lauke et al., "Zur Berechnung der Schlagzaehigkeit von kurzglasfaserverstaerktem Polyethylen", Plaste und.

DATABASE WPI, Week 9127, AN 91-196897 & JP-A-3j 121 146 May 1991.

Steve T. Bowen, "Long Fibre Reinforced Thermoplastics for the Injection Moulding Process", Engineering Plastics, pp. 188–197, 1991.

Kunststoffe. Bd. 65 1975. H.2, vol. 65 No. 2, Von Dr-Ing. A. von Harneir, Bomlitz, pp. 58–63.

*Primary Examiner*—Henry F. Epstein
*Attorney, Agent, or Firm*—Foley & Lardner

[57] ABSTRACT

An injection molding which is built up from a thermoplastic material and glass fibers where the glass fibers have a fiber length of at least 5 mm and are present in an amount of 2 to 8% by weight, based on the total weight of the glass fibers and thermoplastic material. The injection molding has an impact strength at 23° C. of at least 170 kJ/m² and an impact strength at −30° C. of at least 140 kJ/m². The injection molding material is distinguished by a significant improvement in its impact strength, together with an increased heat resistance compared with injection moldings of simple thermoplastic materials which are not reinforced with fibers.

11 Claims, No Drawings

INJECTION MOLDING OF THERMOPLASTIC MATERIAL INCLUDING FROM 2 TO 8% BY WEIGHT OF GLASS FIBERS

FIELD OF THE INVENTION

The invention relates to an injection molding of thermoplastic material having improved mechanical properties, in particular at changing temperatures.

DESCRIPTION OF RELATED ART

Thermoplastics, preferably high density (HD) polyethylene, are the customary material for transportation and packaging boxes. Such boxes are used, for example, for accommodating drinks sterilized by heat and hot foodstuffs, e.g. bread, which are packed directly after production and then stored in cold stores. The boxes are subjected to severe stresses during transportation, due to shock and impact and due to changing temperatures, and their usability is therefore limited.

The use of thermoplastic reinforced with short fibers with the aim of improving the mechanical properties also results in no advantages for this intended use, since the incorporation of even small contents of short fibers leads to embrittlement (cf. Plaste und Kautschuk, Volume 5/1986, 184–187).

SUMMARY OF THE INVENTION

The invention described in the patent claims is based on the object of developing a thermoplastic material for injection-molded moldings which are suitable as transportation and packaging boxes, the moldings being exposed to severe mechanical stresses, in particular at changing temperatures, and being distinguished by a high rigidity, high impact strength and high heat distortion temperature.

According to the invention, the object is achieved by an injection molding which is built up from thermoplastic material comprising glass fibers having a fiber length of at least 5 mm in an amount of 2 to 8% by weight, based on the total weight of glass fibers plus thermoplastic material, the injection molding having an impact strength at +23° C. of at least 170 kJ/m$^2$ and an impact strength at -30° C. of at least 140 kJ/m$^2$.

DETAILED DESCRIPTION

In a preferred embodiment of the invention, the amount of glass fibers in the thermoplastic material is in the range from 3 to 6% by weight.

The injection molding in particular has a tensile E modulus of 1600 to 2500 N/mm$^2$, measured in accordance with DIN 53457, and a Charpy impact strength, measured in accordance with ISO 179/1eU, at +23° C. in the range from 170 to 180 kJ/m$^2$ and at -30° C. in the range from 140 to 160 kJ/m$^2$. It furthermore has a heat distortion temperature HDT/A, measured in accordance with DIN 53 461, in the range from 50° to 80° C.

The thermoplastic material for the injection molding according to the invention preferably comprises a mixture of a polyethylene (A) with a polyethylene (B) reinforced with long glass fibers, the polyethylene (A) preferably having a density in the range from 0.950 to 0.957 g/cm$^3$ and a viscosity number, measured in accordance with DIN 53 728, in the range from 120 to 160 cm$^3$/g. The polyethylene (B) preferably comprises a polyethylene which is prepared by melt pultrusion, is reinforced with long glass fibers and has a viscosity number of $\geq$140 cm$^3$/g and a glass fiber content in the range from 40 to 60% by weight of glass fibers. The polyethylenes of the two components of the mixture can be of the same or a different type.

Surprisingly, it has been found that the injection molding according to the invention is distinguished by a significant improvement in its impact strength, together with a significantly increased heat resistance, compared with injection moldings of simple polyethylenes which are not reinforced with fibers.

With its advantageous physical properties, an injection molding according to the invention can achieve an increased duration of use, in particular also under increased mechanical and thermal stresses of the boxes, when used for its specified intended purpose as a transportation and packaging box.

The invention is illustrated in more detail below for the expert with the aid of a concrete embodiment example.

EXAMPLE 1

19 parts by weight ($\hat{=}$95 % by weight) of polyethylene (A) and 1 part by weight ($\hat{=}$5% by weight) of polyethylene (B) reinforced with 60% by weight of long glass fibers were mixed thoroughly in a customary tumble mixer. The nominal glass fiber content of the thermoplastic material thus obtained was 3% by weight. Injection-molded test specimens were produced therefrom, and the mechanical values shown in Table 1, which are compared with the corresponding values of the pure HD polyethylene (A) for comparison, were measured on these. An injection molding machine from NETSTAL with an open nozzle and a back flow valve was employed for the injection molding. The machine was fitted with a three-zone screw designed for a compression ratio of 1.83. The following injection molding conditions were maintained:

| | |
|---|---|
| cylinder temperature: | 220 to 250° C. |
| material temperature: | 250 to 254° C. |
| mold temperature: | 70° C. |
| screw speed: | 50 to 70 rpm |
| specific injection pressure: | maximum 1700 bar |
| specific dynamic pressure: | 110 bar |
| injection speed: | 45 to 60 mm/s |
| after-pressure time: | 15 to 20 s |
| cooling time: | 30 s |

The polyethylene (A) had a density of 0.957 g/cm$^3$ and a viscosity number of 140 cm$^3$/g. For the polyethylene (B) reinforced with long fibers, a glass fiber roving was preheated and impregnated with molten polyethylene of density 0.957 g/cm$^3$ and viscosity number 140 cm$^3$/g in the melt pultrusion process. After cooling, the impregnated fiber strand was cut into pellets about 10 mm long.

TABLE 1

| Parameter | Unit | Standard | HD-PE (A) | Mixture according to the invention |
|---|---|---|---|---|
| Tensile E modulus | N/mm$^2$ | DIN 53457 | 1320 | 1790 |
| Charpy impact strength/+23° C. | kJ/m$^2$ | ISO 179/1eU | 167 | 179 |
| Charpy impact strength/-30° C. | kJ/m$^2$ | ISO 179/1eU | 103 | 152 |
| Heat distortion temperature HDT/A | ° C. | DIN 53461 | 44 | 60 |

What is claimed is:

1. An injection molding comprising thermoplastic material and glass fibers, wherein said glass fibers have a fiber length of at least 5 mm and are present in an amount of 2 to 8% by weight, based on the total weight of glass fibers plus thermoplastic material, said injection molding material having an impact strength at 23° C. of at least 170 kJ/m$^2$ and an impact strength at −30° C. of at least 140 kJ/m$^2$.

2. An injection molding as claimed in claim 1, wherein the amount of glass fibers in the thermoplastic material is in the range from 3 to 6% by weight.

3. An injection molding as claimed in claim 1 having a tensile E modulus in the range from 1600 to 2500 N/mm$^2$.

4. An injection molding as claimed in claim 1 having a Charpy impact strength at +23° C. in the range from 170 to 180 kJ/m$^2$ and at −30° C. in the range from 140 to 160 kJ/m$^2$.

5. An injection molding as claimed in claim 1 having a heat distortion temperature HDT/A in the range from 50° to 80° C.

6. An injection molding as claimed in claim 1, wherein the thermoplastic material comprises a mixture of a first polyethylene having a density in the range of from 0.950 to 0.957 g/cm$^3$ with a second polyethylene reinforced with long glass fibers and having a glass fiber content in the range from 40 to 60% by weight of glass fibers.

7. An injection molding as claimed in claim 6, wherein said first polyethylene has a viscosity number in the range from 120 to 160 cm$^3$/g.

8. An injection molding as claimed in claim 6, wherein said second polyethylene comprises a polyethylene which is prepared by melt pultrusion, is reinforced with long glass fibers and has a viscosity number of ≧140 cm$^3$/g.

9. An injection molding as claimed in claim 6, wherein said first polyethylene and said second polyethylene of the mixture are different.

10. A transportation and packaging box comprising an injection molding material as claimed in claim 1.

11. A container cover comprising an injection molding material as claimed in claim 1.

* * * * *